(12) United States Patent
Falkman et al.

(10) Patent No.: US 7,931,882 B1
(45) Date of Patent: Apr. 26, 2011

(54) SULFIDE SCAVENGING MEDIA AND ASSOCIATED METHODS

(75) Inventors: Leigh Falkman, Sun City, AZ (US); Dennis W. Van Dover, Boy River, MN (US)

(73) Assignee: Syneco Systems Inc, Chanhassen, MN (US)

( * ) Notice: Subject to any disclaimer, the term of this patent is extended or adjusted under 35 U.S.C. 154(b) by 133 days.

(21) Appl. No.: 12/340,613

(22) Filed: Dec. 19, 2008

(51) Int. Cl.
*B01D 53/48* (2006.01)
*B01D 53/52* (2006.01)
*B01J 20/00* (2006.01)
*B01J 20/22* (2006.01)
*B01J 20/26* (2006.01)
*B01J 20/02* (2006.01)

(52) U.S. Cl. ........ 423/228; 423/220; 423/226; 423/230; 423/242.1; 423/242.2; 423/242.7; 423/244.01; 423/244.02; 423/244.04; 502/400; 502/401; 502/402

(58) Field of Classification Search .............. 423/220, 423/226, 228, 230, 242.1, 242.2, 242.7, 244.01, 423/244.02, 244.04; 502/400, 401, 402
See application file for complete search history.

(56) References Cited

U.S. PATENT DOCUMENTS

| | | | |
|---|---|---|---|
| 2,818,323 A | 12/1957 | Haensel | |
| 4,155,990 A * | 5/1979 | Kimura et al. | 423/574.1 |
| 4,256,728 A | 3/1981 | Nishino et al. | |
| 4,259,301 A | 3/1981 | Say | |
| 4,999,175 A | 3/1991 | Vansant et al. | |
| 5,488,103 A | 1/1996 | Gatlin | |
| 5,698,171 A | 12/1997 | Trauffer et al. | |
| 6,267,938 B1 | 7/2001 | Warrender et al. | |
| 7,140,433 B2 | 11/2006 | Gatlin et al. | |

OTHER PUBLICATIONS

"Safety data for hydrogen sulfide." Oxford Univ., 2005. Visited Jul. 23, 2010 at http://msds.chem.ox.ac.uk/HY/hydrogen_sulfide.html.*

* cited by examiner

*Primary Examiner* — Timothy C Vanoy
*Assistant Examiner* — Daniel Berns
(74) *Attorney, Agent, or Firm* — Cardle Patent Law

(57) ABSTRACT

Compositions and associated methods directed to the removal of sulfurous compounds from air are presented herein. The compositions and methods may be able to treat air with $H_2S$ concentrations of at least 1000 ppm. The compositions and associated methods are used to remove sulfurous compounds from air associated with wastewater systems in various aspects.

26 Claims, 4 Drawing Sheets

SULFIDE SCAVENGING MEDIA AND ASSOCIATED METHODS

BACKGROUND OF THE INVENTION

The production of sulfurous compounds including $H_2S$ under anaerobic conditions in wastewater systems can result in corrosion problems and noxious odors objectionable to the public. Air with such sulfurous compounds entrained therein can be treated in various ways such as by passing the air through some type of scrubber system that removes the sulfurous compounds. Existing technologies have limitations including the ability to economically remove sulfurous compounds from air at the concentrations that may be found, for example, in air associated with wastewater systems located in warm climates. Accordingly there is a need for improved compositions and methods for the removal of sulfurous compounds from air.

BRIEF SUMMARY OF THE INVENTION

Improvements and advantages may be recognized by those of ordinary skill in the art upon study of the present disclosure. In various aspects, the sulfur scavenging composition disclosed herein in various aspects includes a reaction product of an effective amount of one or more sterically hindered alkyl diamines with an effective amount of one or more monoaldehydes and dialdehydes having from 1 to 6 carbon atoms and a solid substrate impregnated with the sulfur scavenging composition.

Methods of scavenging sulfurous compounds from air are disclosed herein. In various aspects, the methods include the step of contacting air with sulfurous compounds entrained therein with a sulfide scavenging media comprising a solid substrate impregnated with a sulfur scavenging composition, the sulfur scavenging composition comprising a reaction product of an effective amount of one or more sterically hindered alkyl diamines with an effective amount of one or more monoaldehydes and dialdehydes having from 1 to 6 carbon atoms.

Figure 1A:
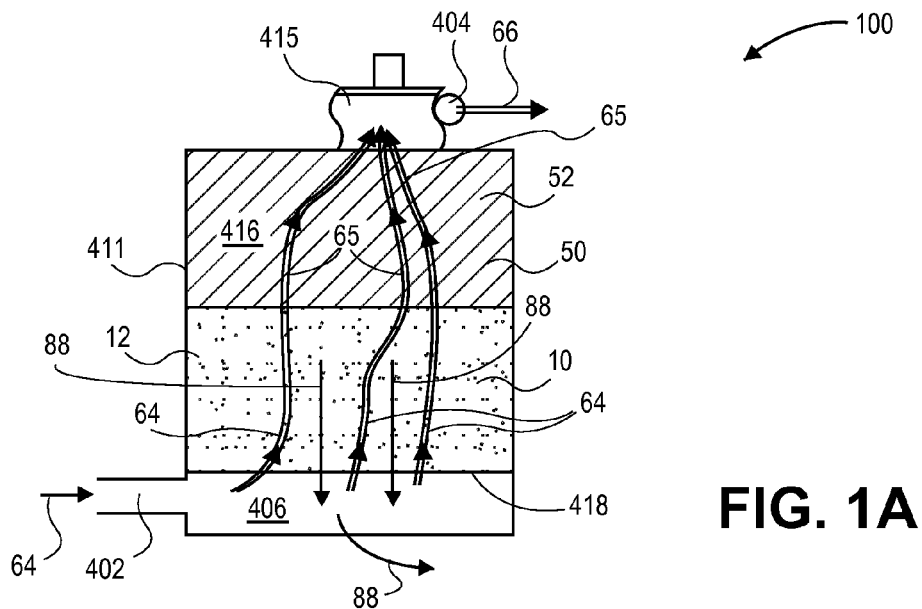
FIG. 1A illustrates by cut-away view an exemplary implementation of a dry scrubber.

The Figures are exemplary only and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

Disclosed herein is a sulfide scavenging media that removes sulfurous compounds, which may have a noxious odor, from air. In various aspects, the air with sulfurous compounds entrained therein may be contacted with the sulfide scavenging media. As the air contacts the sulfide scavenging media, the sulfurous compounds entrained within the air react with a sulfur scavenging composition included as a part of the sulfide scavenging media, and are, accordingly, removed from the air. Methods for removing sulfurous compounds from air using the sulfide scavenging media are also disclosed herein.

The sulfurous compounds include $H_2S$, mercaptans, organic sulfides, and other sulfurous compounds and combinations thereof. The air with the sulfurous compounds entrained therein is derived in various aspects from a waste water system such as a sewer, system of sewers, waste water storage facility, storm water tunnel(s), storm water storage reservoir, combined sewer, combinations thereof, or wastewater treatment process(es) such as a settling tank or sludge processing unit associated with a wastewater treatment facility. The quantity of sulfurous compounds entrained in air derived from a waste water system may vary diurnally and may vary seasonally.

The reaction between the sulfurous compounds and the sulfur scavenging composition removes the sulfurous compounds from the air by converting the sulfurous compounds into polysulfides that are water soluble and may have a generally liquid form. The polysulfides may be biodegradable and thus could be disposed of by input into the process stream of a wastewater treatment plant. The sulfide scavenging media in various aspects includes a substrate impregnated with the sulfur scavenging composition The substrate may be a generally porous non-reactive material such as pozzolan, calcined pozzolan, diatomaceous earth, zeolites, pumice, volcanic tuff, foamed silica, expanded perlite, vermiculite, Fuller's earth, and similar porous mineral based materials. As additional examples, the substrate may be a porous ceramic, a porous generally non-reactive polymer, or other such synthetic material. In various aspects the substrate may be a mineral based material or synthetic material including polymers with an absorbency of at least about 50%.

In some aspects, the substrate, and hence the sulfide scavenging media formed from the substrate may be in the form of particles that may be aggregated into a bed. Air containing sulfurous compounds may flow through the bed, and sulfurous compounds in the air may react with the sulfide scavenging media and are thus converted into polysulfides. In other aspects, the substrate, and, hence, the sulfide scavenging media formed from the substrate, could be a generally porous material such that air with sulfurous compounds entrained therein flows though the sulfides scavenging media, which allows the sulfurous compounds react with the sulfide scavenging media to be converted into polysulfide thereby.

The sulfur scavenging composition includes the reaction product of sterically hindered amines such as selected aliphatic diamines, aliphatic triamines, amino alcohols, and mixtures thereof with aldehydes, aldehyde donors, or the reaction products of lower alkanolamines and lower-aldehydes to form a liquid resin which reacts effectively to convert sulfurous compounds to a water soluble, stable complex. The sulfur scavenging composition, in various aspects, is a reaction product of an effective amount of one or more sterically hindered alkyl diamines with an effective amount of one or more monoaldehydes and dialdehydes having from 1 to 6 carbon atoms. Further details of the formation and properties of the sulfur scavenging composition may be found in Gatlin, U.S. Pat. No. 5,488,103 entitled "Hydrogen Sulfide Converter," which is hereby incorporated herein by reference in its entirety for any and all purposes.

The sulfide scavenging media may be formed by soaking the substrate in the sulfur scavenging composition or otherwise impregnating the substrate with the sulfur scavenging composition. In various aspects, the sulfur scavenging composition is diluted with a solvent such as water or alcohol, and the substrate impregnated with the sulfur scavenging composition so diluted. When the sulfide scavenging media is formed by soaking the substrate in the sulfur scavenging composition, the substrate is generally immersed in the sulfur scavenging composition until the sulfur scavenging composition is absorbed by the substrate. The porous nature of the substrate in various aspects may enhance the ability of the substrate to absorb the sulfur scavenging composition. After the substrate is generally saturated with the sulfur scavenging composition to form the sulfide scavenging media, any excess sulfur scavenging composition is drained away. The resulting sulfide scavenging media includes the substrate now impregnated with the sulfur scavenging composition, which may or may not be diluted by various solvents.

As noted in Gatlin, in theory about 1 ppm (part per million) to about 2 ppm of the sulfur scavenging composition may convert about 1 ppm of $H_2S$. However, about 2 ppm to about 4 ppm of sulfur scavenging composition may be required to convert about 1 ppm of $H_2S$ when the sulfur scavenging composition is injected as a fluid into a stream of gas or liquid containing $H_2S$ as the result of incomplete contact between the sulfur scavenging composition and the $H_2S$ in the stream of gas or liquid. By incorporating the sulfur scavenging composition onto a substrate to produce the sulfide scavenging media and then contacting air with sulfurous compounds entrained therein with the sulfide scavenging media, the effectiveness of the contact between the air with sulfurous compounds entrained therein and the sulfur scavenging composition may be enhanced. Accordingly, the amount of sulfur scavenging composition required to convert, for example, about 1 ppm of $H_2S$ to polysulfide may approach the theoretical value of about 1 ppm to about 2 ppm of sulfur scavenging composition, as the sulfur scavenging composition impregnated into the sulfur scavenging composition is consumed only upon reaction with the sulfurous compounds.

The Figures referenced herein generally illustrate various exemplary implementations of the sulfide scavenging media and methods for removing sulfurous compounds from air using the sulfide scavenging media. These illustrated implementations are not meant to limit the scope of coverage, but, instead, to assist in understanding the context of the language used in this specification and in the claims. Accordingly, variations of the compositions and methods that differ from these illustrated implementations may be encompassed by the appended claims.

FIG. 1A illustrates an implementation of dry scrubber 100 to remove sulfurous compounds entrained in air that includes bed 12 of sulfide scavenging media 10 and bed 52 of amine scavenging media 50. The dry scrubber 100, as illustrated, includes a scrubber housing 411 and divider wall 418 that in combination define chamber 416 and plenum 406. The scrubber housing 411 defines inlet 402 to admit air 64 that may have sulfurous compounds entrained therein into the plenum 406. The divider wall 418, in this implementation, is formed with apertures (not shown) to pass air 64 from the plenum 406 into chamber 416. For example, the divider wall 418 may be formed as a grated structure or as a metal sheet with holes disposed thereabout. The housing 411 and the divider wall 418 may be composed of metal such as steel, aluminum, fiberglass, various polymers or of other suitable materials and combinations of materials that may be corrosion resistant or covered with corrosion resistant materials as would be recognized by those of ordinary skill in the art upon study of this disclosure.

As illustrated in FIG. 1A, sulfide scavenging media 10 is formed into bed 12 within chamber 416, and bed 12 rests upon the divider wall 418. Bed 52 of amine scavenging media 50 rests upon bed 12 of sulfide scavenging media 10 within chamber 416 in this implementation. Air 65 with sulfurous compounds generally removed therefrom by the bed 12 of sulfide scavenging media 10 may flow from the bed 12 of sulfide scavenging media 10 into bed 52 of amine scavenging media 50. Polysulfide 88 formed within the bed 10 by conversion of sulfurous compounds. The polysulfide 88 may be generally liquid in some implementations and, thus, a portion of the polysulfide 88 may flow out of the bed 12, as illustrated, generally into the plenum 406 under the influence of gravity. The polysulfide 88 could be collect from the plenum 406 or otherwise collected from dry scrubber 100 for disposal. The flow of polysulfide 88 out of the bed 12 may prevent or at least mitigate clogging of bed 12 by the buildup of polysulfide 88 within the bed.

The plenum 406 generally allows the pressure of the air 64 to equilibrate after passage through inlet 402 in order to distribute air 64 relatively uniformly over the bed 12 of sulfide scavenging media 10 from the plenum 406 through the divider wall 418, and, in turn, distributes air 65 relatively uniformly over bed 52 of amine scavenging media 50.

Fan 415 is provided to draw the air 64 into the plenum 406 through inlet 402 and thence into the bed 12 of sulfide scavenging media 10 in this implementation. The fan 415, as illustrated in FIG. 1A, draws air 65 from the bed 12 of sulfide scavenging media 10 into bed 52 of amine scavenging media 50. Air 66 contains (i) sulfurous compounds removed therefrom by the bed 12 of sulfide scavenging media 10 and (ii) amines volatilized from the bed 12 of sulfide scavenging media 10 removed therefrom by bed 52 of amine scavenging media 50. Air 66 is ejected from the chamber 416 into the ambient environment through outlet 404 by fan 415. In this implementation, the fan 415 is oriented such that the intake side of the fan 415 draws air 64 into the plenum 406 and thence chamber 416. In other implementations (not shown), the fan 415 could be oriented such that air 64 is propelled from the discharge side of the fan 415 into the plenum 406 and thence chamber 416. In still other implementations, thermal convection may flow the air 64 into the bed 12 of sulfide scavenging media 10 and thence air 65 into bed 52 of amine scavenging media 50, or other motive forces and/or mechanisms may be employed. In this implementation, bed 12 and bed 52 are fixed and bed 52 rests upon bed 12 in a single chamber 416. In other implementations (not shown) bed 12 and bed 52 may be in separate chambers, may be fluidized, or may be formed in various other ways.

Amine scavenging media 52 generally removes amines from air 65 that may be volatilized into air 65 from bed 12 of sulfide scavenging media 10 as the air 65 passes through the bed 52 of amine scavenging media 50. In various implementations, the amine scavenging media may be activated carbon such as activated carbon derived from coconut shells.

Figure 1B:
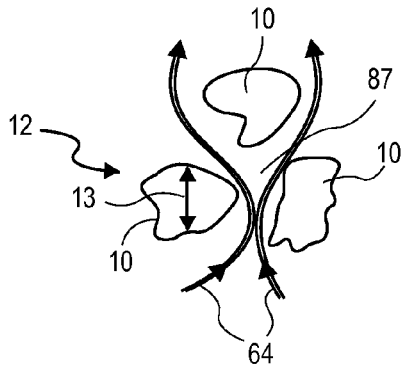
FIG. 1B illustrates by detailed cut-away view the flow of air through portions of the bed of sulfide scavenging media within the dry scrubber of FIG. 1A.

FIG. 1B illustrates a detail of bed 12 of sulfide scavenging media 10. As illustrated in FIG. 1B, the sulfide scavenging media 10 is formed as particles with particle size 13. The particle size 13 of the particles of sulfide scavenging media 10 may be chosen such that air 64 may flow through bed 12 and contact the sulfide scavenging media 10. In various implementations, the particle size 13 may range from about ⅜ inch to about ½ inch. Interstitial region 87 is a void space between particles of sulfide scavenging media 10, and the interstitial region 87 is generally filled with air 64 as the air passes through the bed 12. The interstitial region 87 is generally devoid of liquids other than polysulfide 88 (FIG. 1A) formed by conversion of the sulfurous compounds by the sulfide scavenging media.

Figure 1C:
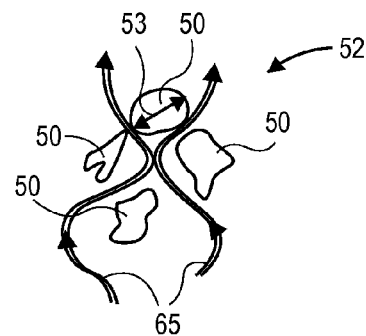
FIG. 1C illustrates by detailed cut-away view the flow of air through portions of the bed of amine scavenging media within the dry scrubber of FIG. 1A.

As illustrated in FIG. 1C, the amine scavenging media 50 may be formed as particles having a particle size 53 chosen such that air 65 may flow through the bed 52 and contact the amine scavenging media 50. In various implementations, the particle size 53 may range from 4×8 mesh.

Figure 1D:
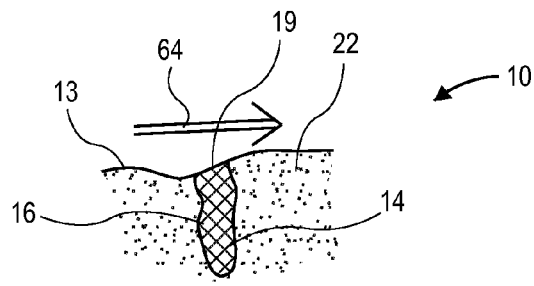
FIG. 1D illustrates by detailed cut-away view the flow of air about portions of a particle of sulfide scavenging media within the dry scrubber of FIG. 1A.

FIG. 1D illustrates a portion of the sulfide scavenging media 10 that includes substrate 22 impregnated with sulfur scavenging composition 16. As illustrated in FIG. 1D, the sulfide scavenging media 10 includes pore 14 defined by surface 13. Sulfur scavenging composition 16 is retained in the pore 14 with a portion of the sulfur scavenging composition 16 exposed at pore entrance 19 of pore 14. Various forces such as capillary forces, adsoptive forces, and/or absorptive forces may retain the sulfur scavenging composition 16 within the pore 14 or otherwise retain the sulfur scavenging composition 16 about substrate 22 and prevent volatilization or other losses of the sulfur scavenging composition 16 from the substrate 22. The sulfur scavenging composition 16 may be retained about the substrate 22 in ways other then that illustrated in FIG. 1D in various implementations.

As air 64 passes proximate surface 13 as illustrated in FIG. 1D, the air 64 contacts the sulfur scavenging composition 16 generally proximate the pore entrance 19, which allows sulfurous compounds entrained in the air 64 to react with the sulfur scavenging composition 16 to be converted into polysulfide 88. As sulfur scavenging composition 16 generally proximate surface 13 is consumed by reaction with sulfurous compounds, a concentration gradient may be produced that may cause sulfur scavenging composition 16 within the substrate 22 to diffuse to the surface 13 to replenish the sulfur scavenging composition 16 so consumed. For example, as the sulfur scavenging composition 16 proximate the pore entrance 19 in FIG. 1D is consumed by reaction with sulfurous compounds, additional sulfur scavenging composition 16 may diffuse generally to the pore entrance 19 from within the pore 14 to provide additional sulfur scavenging composition 16 for reaction with sulfurous compounds in air 64. Accordingly, the consumption of the sulfur scavenging composition 16 is regulated by contact with the sulfurous compound(s) entrained in the air, which may allow the sulfide scavenging media to respond to variations in the quantity of sulfurous compounds in the air. A bed of sulfide scavenging media may be capable of treating air with an $H_2S$ concentration of at least 1,000 ppm in various implementations with generally complete removal of the $H_2S$ from the air.

Returning to FIG. 1A, in operation, fan 415 draws air 64 with sulfurous compounds entrained therein into plenum 406 through inlet 402. The air 64 is then drawn from the plenum 406 through divider wall 418 into bed 12 of sulfide scavenging media 10. The sulfurous compounds react with the sulfur scavenging composition 16 impregnated into the sulfide scavenging media 10 and are converted thereby into a water soluble polysulfide 88 that may be generally liquid. The polysulfide 88 in some implementations may be retained, at least in part, within the bed 12. In some implementations, at least a portion of the polysulfide 88 may be eluded as a liquid from the bed 12, and may be withdrawn from the dry scrubber 100 and disposed of as illustrated in FIG. 1A.

Amines may be volitilized from the bed 12 particularly during initial operation of the bed 12. Air 65 that may have amines entrained therein flows from bed 12 into bed 52 of amine scavenging media 50. Amines, if any, entrained within the air 65 are generally adsorbed by the bed 52. In some implementations, the bed 52 may adsorb sulfurous compounds that pass through bed 12. Air 66 with sulfurous compounds generally removed therefrom and with amines generally removed therefrom may be discharged through outlet 404 into, for example, the ambient environment. Exiting air 66 may be generally devoid of the noxious odors of sulfurous compound and the noxious odors of amines.

Figure 2:
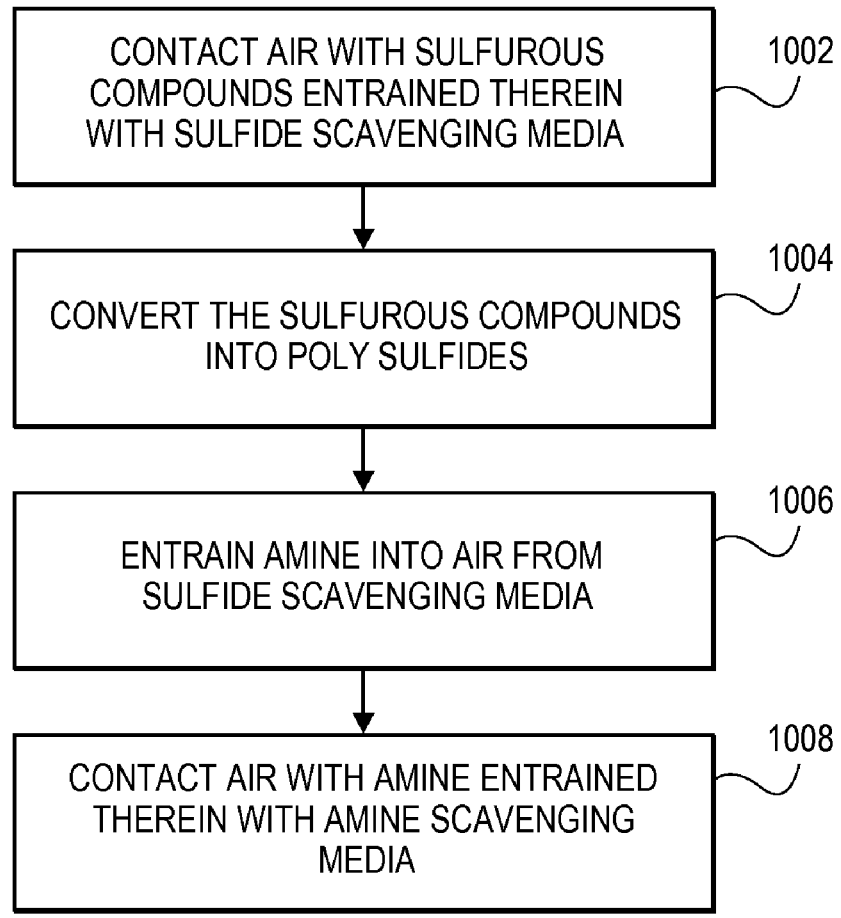
FIG. 2 illustrates by process overview flow chart an exemplary series of process steps for the removal of sulfurous compounds from air.

FIG. 2 illustrates by process overview flow chart an exemplary series of process steps for the removal of sulfurous compounds from air. In step 1002, air with sulfurous compounds entrained therein is contacted with sulfide scavenging media such as sulfide scavenging media 12. In Step 1004, the sulfide scavenging media converts the sulfurous compounds into polysulfide such as polysulfide 88. The sulfide scavenging media may release amines into the air as indicated by step 1006. The air is then contacted with an amine scavenging media such as amine scavenging media 52 as indicated in step 1008. In various aspects, the methods may include the step (not shown) of draining at least a portion of the polysulfides from the sulfide scavenging media.

EXAMPLES

These Examples are provided for illustrative purposes only and are not to be considered as limiting except where expressly so stated.

Example 1

In Example 1, the sulfide scavenging media was formed from SULFA CLEAR® 8640 as the sulfur scavenging composition in combination with calcined pozzolan as the substrate. SULFA CLEAR® 8640 is a polymeric amine as described in Gatlin and produced by Weatherford Inc., Houston, Tx. The SULFA CLEAR® 8640 was diluted with water at a 1:1 ratio by volume, i.e. 1 gallon of SULFA CLEAR® 8640 was mixed with 1 gallon of water in this Example. The resulting SULFA CLEAR® 8640-water mixture weighted between 8.58 and 8.71 pounds per gal. The substrate in Example 1 was calcimined pozzolan distributed under the name Absorbs-All® by Western Pozzolan Corp., Lassen Calif. The dry calcined pozzolan was in the form of particles with particle size ranging generally from about ⅜ inch to about ½ inch. The dry calcined pozzolan weighted between about 41 lbs to 45 lbs/ft$^3$ so that 40 ft$^3$ of calcined pozzolan weighed generally between about 1700 lbs and about 1800 lbs.

In order to form the sulfide scavenging media, about 220 gal. of the SULFA CLEAR® 8640-water mixture was combined with about 40 ft³ of generally dry calcined pozzolan substrate in an open vat such that the calcined pozzolan substrate was completely submerged by the SULFA CLEAR® 8640-water mixture. After allowing the calcined pozzolan substrate to soak for about 20 minutes, any excess SULFA CLEAR® 8640-water mixture was drained from the vat and hence from the calcined pozzolan substrate. The resulting sulfide scavenging media is the calcined pozzolan substrate combined with the portion of the SULFA CLEAR® 8640-water mixture absorbed by the calcined pozzolan—i.e. the portion of the SULFA CLEAR® 8640-water mixture that does not freely drain from the calcined pozzolan by gravity.

The porosity of the calcined pozzolan in this Example is roughly about 70%. Generally, per this Example, 1750 lbs. of calcined pozzolan absorbed about 975 pounds of SULFA CLEAR® 8640-water mixture or about 56% by weight. Thus, 1 ft³ foot of the sulfide scavenging media in this example weighs about 67 lbs, which is apportioned as 43 lbs of calcined pozzolan and 24 lbs of SULFA CLEAR® 8640-water mixture.

Example 2

In Example 2, the sulfide scavenging media was formed from SULFA CLEAR® 8640 as the sulfur scavenging composition in combination with diatomaceous earth as the substrate. The SULFA CLEAR® 8640. The SULFA CLEAR® 8640 was diluted with water at a 1:1 ratio by volume, i.e. 1 gallon of SULFA CLEAR® 8640 was mixed with 1 gallon of water in this Example. The diatomaceous earth substrate was Celatom 2S51C manufactured by Eagle Picher Corp., Dearborn, Mi. The dry diatomaceous earth substrate weighted approximately 25 lbs/ft³ and was formed into particles with particle size ranging generally from about ¼ inch to about ⅜ inch.

In order to form the sulfide scavenging media, about 220 gal. of SULFA CLEAR® 8640-water mixture was combined with about 40 ft³ of generally dry diatomaceous earth substrate in an open vat such that the diatomaceous earth substrate was completely submerged by the SULFA CLEAR® 8640-water mixture. After allowing the diatomaceous earth substrate to absorb the SULFA CLEAR® 8640-water mixture for about 20 minutes, any excess SULFA CLEAR®8640-water mixture was drained from the vat and, hence, from the diatomaceous earth substrate. The resulting sulfide scavenging media in this Example is the diatomaceous earth substrate combined with the portion of the SULFA CLEAR® 8640-water mixture absorbed by the diatomaceous earth substrate—i.e. the portion of the SULFA CLEAR® 8640-water mixture that does not freely drain from the diatomaceous earth substrate by gravity.

Generally, per this Example, 1000 lbs. of diatomaceous earth absorbed about 975 pounds of SULFA CLEAR® 8640-water mixture or about 98% by weight. Thus, 1 ft³ foot of the sulfide scavenging media of Example 2 weighed about 49 lbs, which is apportioned as 25 lbs of diatomaceous earth and 24 lbs of SULFA CLEAR® 8640-water mixture.

Example 3

An in situ test of the sulfide scavenging media generally described in Example 1 above was conducted. This in situ test was conducted on a wastewater system located in the Southwestern United States.

A bed was formed of the sulfide scavenging media. The bed was generally cylindrical in shape with a diameter of approximately 22 inches and a thickness measured along the cylindrical axis of approximately 30½ inches. The bed contained approximately 6.4 ft³ of sulfide scavenging media.

Air flowed through the bed generally parallel to the cylindrical axis. The source of the air was a wastewater system, and the air included sulfurous compounds generally in the form of $H_2S$. The sulfurous compounds were likely generated by anaerobic activity generally within the wastewater system. Some results obtained from this in situ test are given in Table 1. In this Table, the flow rate is the flow rate in cubic feet per minute (cfm) of air delivered to the bed of sulfide scavenging media. The retention time is the time period over which the air is in contact with the sulfide scavenging media. The retention time in seconds(s) is calculated as the bed volume divided by the flow rate. The concentration of $H_2S$ in the air delivered to the bed of sulfide scavenging media (inflow) and the concentration of the $H_2S$ in the air effluent from the bed of sulfide scavenging media (outflow) are given in parts per million (ppm).

Two different methods were used to determine the $H_2S$ concentration. The first method utilized a Model AP-20S is gas detection pump kit manufactured by Sensidyne LP of Clearwater, Fl. The tubes used in conjunction with this pump kit (which were manufactured by Sensidyne) measured $H_2S$ over a range generally between 25 ppm and 2000 ppm with a sensitivity of 0.05 ppm. The second method employed an Odalog Model Type 1 manufactured by App-Tek, Pine Rivers Shire, Queensland, Australia. The Odalog Model Type 1 measured $H_2S$ over a range generally between 0 ppm and 1000 PPM with sensitivity of 0.001 ppm.

The ammonia concentration and the amine concentration in the outflow air as given in Table 1 were measured with the Sensidyne Model AP-20S pump kit and with ammonia and amine tubes with Ranges of 1 to 20 ppm with sensitivity of 0.05 ppm. Amine and ammonia were generally not detected in the inflow air.

TABLE 1

| | Flow Rate (cfm) | Retention time(s) | $H_2S$ in Inflow (ppm) | $H_2S$ in Outflow (ppm) | Removal (%) | Ammonia (ppm) | Amine (ppm) |
|---|---|---|---|---|---|---|---|
| Week 1 | 25 | 15.4 | 700† | 0† | 100† | — | — |
| Week 2 | 50 | 7.68 | 329§ | 3§ | 99§ | — | — |
| | | | 200† | 0† | 100† | | |
| Week 3 | 75 | 5.12 | 312§ | 0§ | 100§ | — | — |
| | | | 350† | 0† | 100† | | |
| Week 4 | 75 | 5.12 | 157§ | 1§ | 99§ | — | — |
| | | | 175† | 0† | 100† | | |
| Week 5 | 58 | 6.61 | 138§ | 0§ | 100§ | 5 | 5 |
| | | | 81† | 0† | 100† | | |
| Week 6 | 67 | 5.73 | 173§ | 1§ | 99§ | 8 | 10 |
| Week 7 | 78 | 4.92 | 236§ | 3§ | 99§ | 8 | 3 |
| Week 8 | 78 | 4.92 | 161§ | 4§ | 98§ | 18 | 10 |
| Week 9 | 78 | 4.92 | 222§ | 4§ | 98§ | — | 1 |

§Odalog Model Type 1 [average value]
†Sensidyne test [spot test]

As indicated in Table 1, the bed of sulfide scavenging media was able to remove to generally detectable limits sulfurous compounds in the form of $H_2S$ from the inflow air at concentrations in excess of 300 ppm with retention times less than or equal to about 15 seconds. For example, the bed converted $H_2S$ with an inflow concentration of 329 ppm at a retention time of 7.68 seconds as indicated by the data for Week 2 in Table 1. The small amounts of $H_2S$ in the outflow air measured at Weeks 7, 8, and 9 in Table 1 may be the result of incomplete conversion of the $H_2S$ in the sulfide scavenging media due to the relatively short retention time of 4.92 seconds in combination with $H_2S$ concentration in excess of 150 ppm, and not the result of column break through or exhaustion of the sulfide scavenging media. Based on analysis of these results, it was estimated that 1 ft³ of sulfide scavenging media converted 12.1 lbs of $H_2S$ during the 70 day period of this Example—see Appendix 1.

In general, for an $H_2S$ concentration of less than about 50 ppm, retention time of between about 5 seconds and about 10 seconds is preferred in order to ensure complete conversion of the $H_2S$. For an $H_2S$ concentration between about 50 ppm and about 150 ppm, it is preferred that the retention time should be generally within the range of from about 10 seconds to about 15 seconds. For an $H_2S$ concentration between about 150 ppm and about 1000 ppm, it is preferred that the retention time should be generally in the range of from about 15 seconds to about 20 seconds.

Peak (maximum) values for $H_2S$ for the inflow air into the bed and the outflow air from the bed as measured using the Odalog Model Type 1 for Example 3 are presented in Table 2.

TABLE 2

|  | Peak $H_2S$ in Inflow (ppm) | Peak $H_2S$ in Outflow (ppm) | Removal % |
|---|---|---|---|
| Week 1 | — | — | — |
| Week 2 | 816 | 74 | 90 |
| Week 3 | 878 | 1 | 100 |
| Week 4 | 755 | 22 | 97 |
| Week 5 | 299 | 3 | 99 |
| Week 6 | 594 | 10 | 98 |
| Week 7 | 1000* | 32 | 97 |
| Week 8 | 996 | 34 | 97 |
| Week 9 | 398 | 48 | 88 |
| Week 10 | 1000* | 16 | 98 |

*the maximum measurable value using the Odalog Model Type 1
— the actual value may exceed 1000 ppm.

As indicated by the results in Table 2, the bed of sulfide scavenging media is generally able to convert and thus generally remove $H_2S$ from the influent air at $H_2S$ concentrations approaching or exceeding 1000 ppm without breakthrough or exhaustion over the indicated time period. By increasing the retention time of the air in the bed of sulfide scavenging media, it is posited that the removal may reach about 100% at $H_2S$ concentrations of 1000 ppm or more.

Figure 3A:
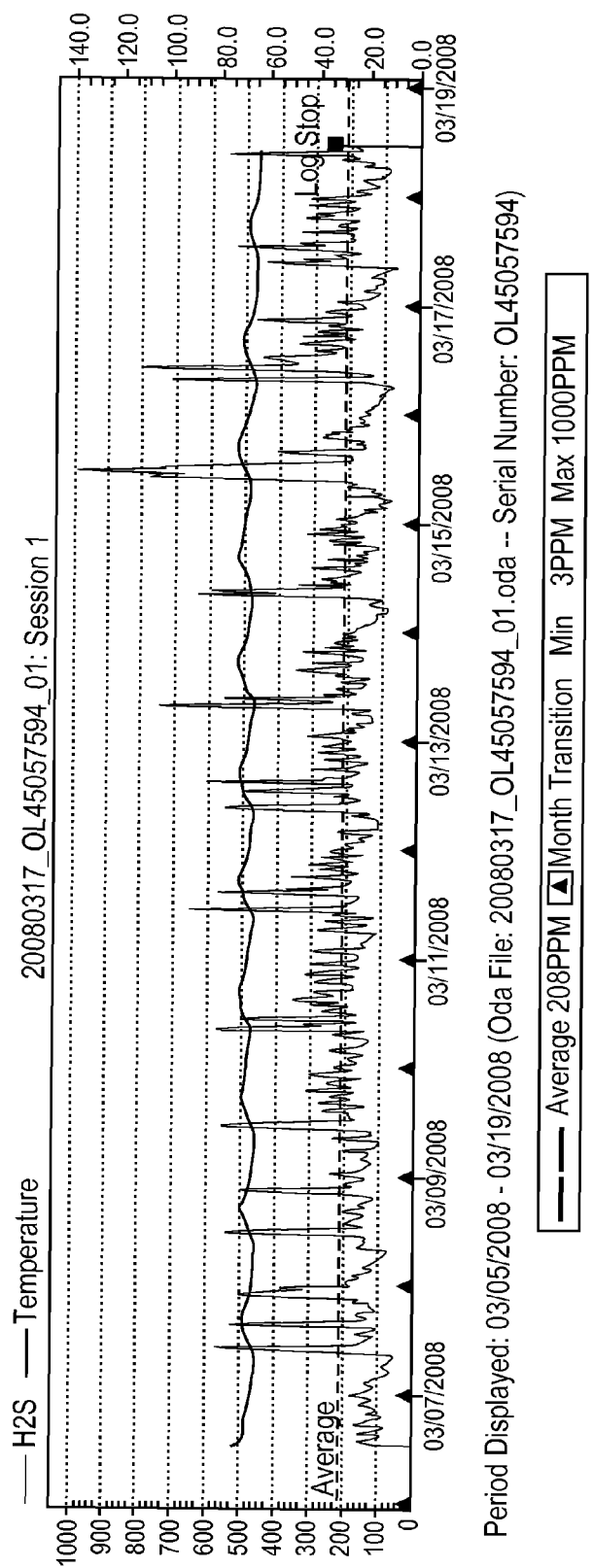
FIG. 3A illustrates by strip chart the concentration of $H_2S$ in the inflow air into the bed of sulfide scavenging media during Week 10 of Example 3.
Figure 3B:
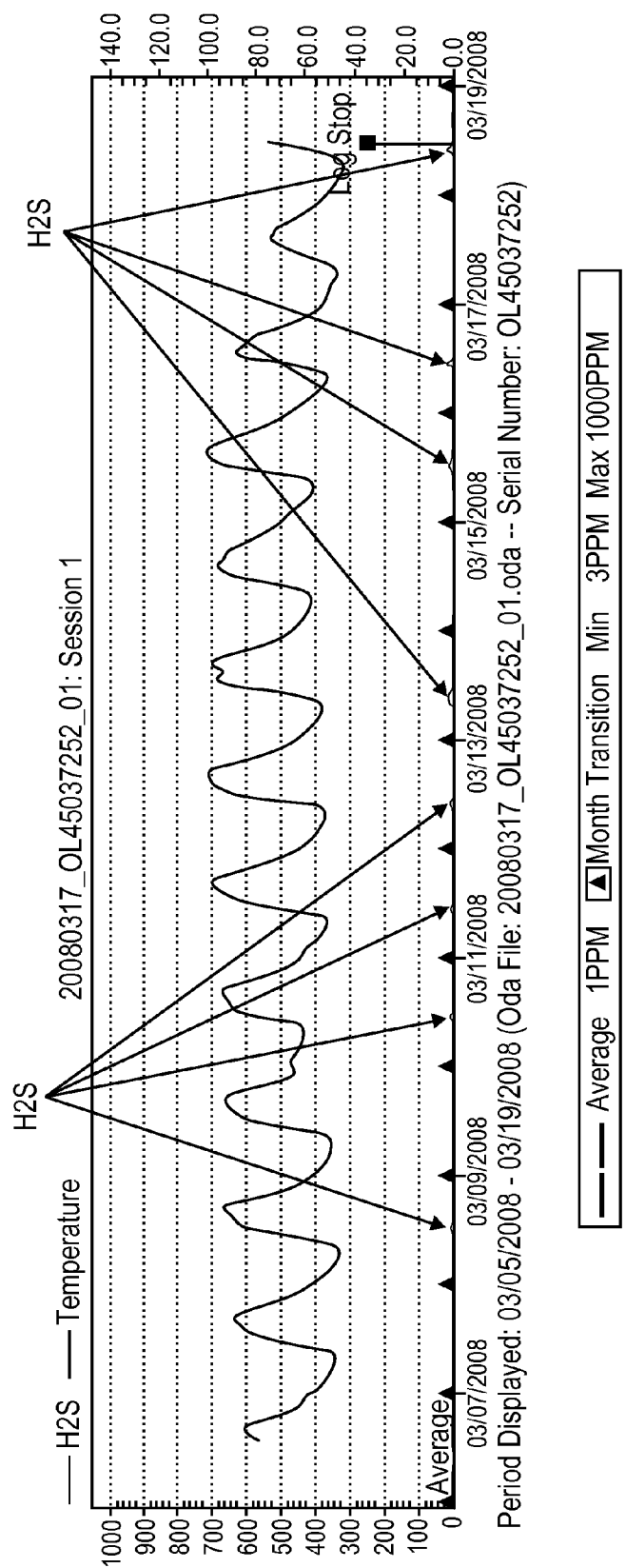
FIG. 3B illustrates by strip chart the concentration of $H_2S$ in the outflow air from the bed of sulfide scavenging media during Week 10 of Example 3.

FIGS. 3A and 3B illustrates measured inflow and outflow concentrations of $H_2S$ during Week 10. FIG. 3A illustrates graphically the measured $H_2S$ concentration in ppm of the inflow air into the bed as a function of time during Week 10 of Example 3 as measured using the Odalog Model Type 1. The $H_2S$ concentration in the inflow air is characterized by spikes about the average $H_2S$ concentration, as illustrated. The temperature in degrees Fahrenheit of the inflow air is also shown in FIG. 3A. Note that the Odalog Model Type 1 measures H2S concentrations up to 1000 ppm so that the 1000 ppm spike in FIG. 3A could be indicative of an $H_2S$ concentration greater than 1000 ppm. Also, the bed of sulfide scavenging media has not been recharged during the 10 week period covered by this Example. No substantial reductions in air flow through the bed were noted during the 10 week period encompassed by this example such as might be caused by build up of polysulfide in the bed.

FIG. 3B illustrates graphically the corresponding measured $H_2S$ concentration in ppm of the outflow air from the bed as a function of time during Week 10 of Example 3 as measured using the Odalog Model Type 1. FIG. 3B also shows the temperature in degrees Fahrenheit of the outflow air from the bed. In general, the bed of sulfide scavenging media is able to respond to the spikes of $H_2S$ concentration in the inflow so that the $H_2S$ is generally removed from the outflow air, as indicated by FIG. 3B.

APPENDIX 1

Average $H_2S$ concentration into the bed=264 ppm
Average $H_2S$ concentration out of the bed=2 ppm
Time period=70 d.
Average flow rate=63 ft³/min
Temperature 20° C.=293K
The mass of H2S retained in the bed can then be calculated by:

$$262\text{ppm} \times [34\text{g/mole}]/[(0.0825\text{atm l/mole K})(293K)] = 368\text{mg/m}^3 \rightarrow 3.68 \times 10^{-4} \text{kg/m}^3$$

$$63\text{ft}^3/\text{min} \times 60\text{min/hr} \times 24\text{h/d} \times 70\text{d} = 6.35 \times 10^6 \text{ft}^3 = 1.80 \times 10^5 \text{m}^3$$

$$3.68 \times 10^{-4} \text{kg/m}^3 \times 1.80 \times 10^5 \text{m}^3 = 66.2\text{kg} = 145.7\text{lbs}$$

Bed volume=6.4ft³=0.1812m³

The mass of H2S retained in the bed is then 66.2 kg/0.1812 m³=365 kg/m³=22.6 lb/ft³

The foregoing along with the accompanying Figures discloses and describes various exemplary implementations. Upon study thereof, one of ordinary skill in the art may readily recognize that various changes, modifications and variations can be made therein without departing from the spirit and scope of the inventions as defined in the following claims.

What is claimed is:

1. A sulfide scavenging media, comprising:
   a sulfur scavenging composition comprising a reaction product of an effective amount of one or more sterically hindered alkyl diamines with an effective amount of one or more monoaldehydes and dialdehydes having from 1 to 6 carbon atoms;
   a solid substrate impregnated with the sulfur scavenging composition; and air with sulfurous compounds entrained therein interposed within interstitial regions defined by the solid substrate, the air retained in the interstitial regions for less than about 20 seconds.

2. The composition, as in claim 1, wherein the solid substrate is selected from the group consisting of pozzolan, calcined pozzolan, diatomaceous earth, zeolite, pumice, volcanic tuff, foamed silica, expanded perlite, vermiculite, and Fuller's earth.

3. The composition, as in claim 1, wherein the solid substrate is generally in the form of particles.

4. The composition, as in claim 3, wherein the particles have a particle size ranging generally from about ⅛ inch to about ½ inch.

5. The composition, as in claim 1, wherein the solid substrate absorbs at least about 50% by weight of the sulfur scavenging composition.

6. The composition, as in claim 1, wherein the sulfurous compounds entrained within the air comprise $H_2S$ at an initial concentration generally within the range from about 20 ppm to about 1000 ppm, and the sulfurous compounds are reduced to a concentration of less than 1 ppm by retention within the interstitial regions.

7. The composition, as in claim 1, wherein the sulfurous compounds entrained within the air are reduced to a concentration of less than 1 ppm by retention within the interstitial regions.

8. The composition, as in claim 1, wherein the air is retained within the interstitial regions generally within the range of from about 15 seconds to about 20 seconds.

9. The composition, as in claim 1, wherein the sulfurous compounds entrained within the air comprise $H_2S$ at an initial concentration generally within the range from about 50 ppm to about 1000 ppm.

10. The composition, as in claim 1, wherein the sulfurous compounds entrained within the air comprise $H_2S$ at an initial concentration generally within the range from about 100 ppm to about 1000 ppm.

11. The composition, as in claim 1, wherein the sulfurous compounds entrained within the air comprise $H_2S$ at an initial concentration generally within the range from about 50 ppm to about 150 ppm.

12. The composition, as in claim 1, wherein the air is retained within the interstitial regions generally within the range of from about 10 seconds to about 15 seconds.

13. The composition, as in claim 1, wherein the sulfurous compounds entrained within the air comprise $H_2S$ at an initial concentration generally within the range from about 150 ppm to about 1000 ppm.

14. The composition, as in claim 1, wherein 1 ft$^3$ of the particles of solid substrate impregnated with the sulfur scavenging composition converts at least 20 lbs of $H_2S$ into polysulfide.

15. The composition, as in claim 1, wherein air having an $H_2S$ concentration of about 100 ppm is flowing within interstitial regions of a bed formed of particles of solid substrate impregnated with the sulfur scavenging composition for at least 70 days without breakthrough, the bed being less than about 2.5 ft. thick and having a retention time for the air therein of less than about 10 seconds.

16. The composition, as in claim 1, wherein the air with sulfurous compounds entrained therein is derived from a wastewater system.

17. The composition, as in claim 1, wherein the solid substrate comprises calcined pozzolan.

18. A sulfide scavenging media, comprising:
  a sulfur scavenging composition comprising a polymeric amine;
  a solid substrate impregnated with the sulfur scavenging composition; and
  air with sulfurous compounds entrained therein interposed within interstitial regions defined by the solid substrate and retained in the interstitial regions for less than about 20 seconds, wherein the sulfurous compounds comprise $H_2S$ at an initial concentration generally within the range from about 20 ppm to about 1000 ppm, and the sulfurous compounds are reduced to a concentration of less than 1 ppm by retention within the interstitial regions.

19. The composition, as in claim 18, wherein the sulfurous compounds entrained within the air comprise $H_2S$ at an initial concentration generally within the range from about 50 ppm to about 150 ppm.

20. The composition, as in claim 18, wherein the air is retained within the interstitial regions generally within the range of from about 10 seconds to about 15 seconds.

21. The composition, as in claim 18, wherein the sulfurous compounds entrained within the air comprise $H_2S$ at an initial concentration generally within the range from about 150 ppm to about 1000 ppm.

22. The composition, as in claim 18, wherein the air is retained within the interstitial regions generally within the range of from about 15 seconds to about 20 seconds.

23. The composition, as in claim 18, wherein 1 ft$^3$ of the particles of solid substrate impregnated with the sulfur scavenging composition converts at least 20 lbs of $H_2S$ into polysulfide.

24. The composition, as in claim 18, wherein air having an $H_2S$ concentration of about 100 ppm is flowing within interstitial regions of a bed formed of particles of solid substrate impregnated with the sulfur scavenging composition for at least 70 days without breakthrough, the bed being less than about 2.5 ft. thick and having a retention time for the air therein of less than about 10 seconds.

25. The composition, as in claim 18, wherein the air with sulfurous compounds entrained therein is derived from a wastewater system.

26. The composition, as in claim 18, wherein the solid substrate is selected from the group consisting of pozzolan, calcined pozzolan, diatomaceous earth, zeolite, pumice, volcanic tuff, foamed silica, expanded perlite, vermiculite, and Fuller's earth.

* * * * *